United States Patent [19]
Saltz et al.

[11] 3,869,666
[45] Mar. 4, 1975

[54] MAXIMUM SLOPE DETECTORS

[76] Inventors: Julian Saltz, 16 Benford Dr., Princeton Junction, 08550; Joseph C. Wasilewski, 29 Melville Rd., Cranbury, both of N.J. 08512

[22] Filed: Dec. 26, 1973

[21] Appl. No.: 428,042

[52] U.S. Cl................ 324/76 R, 328/114, 328/132
[51] Int. Cl........................................... G01r 19/12
[58] Field of Search....... 324/103 P, 76 R; 328/132, 328/151, 114

[56] References Cited
UNITED STATES PATENTS
3,786,352   1/1974   Woods et al...................... 328/132

*Primary Examiner*—Alfred E. Smith
*Assistant Examiner*—Ernest F. Karlsen
*Attorney, Agent, or Firm*—Martin Sachs, Esq.

[57] ABSTRACT

An instrument and method for obtaining the maximum slope of a function such as a sigmoidally shaped curve is disclosed. The instrument is capable of displaying the point of maximum slope for an indefinite period of time. The disclosed instrument when used in conjunction with conventional converters is ideally suited for reaction rate measurements frequently encountered in the kinetic analysis of enzymes, or in any other chemical reaction which follows a sigmoidally shaped curve and where reliability in determining the point of maximum slope in a minimum of time is critical.

11 Claims, 3 Drawing Figures

MAXIMUM SLOPE DETECTORS

BACKGROUND OF THE INVENTION

This invention relates to recording instruments and, in particular, to an instrument and method for obtaining and displaying the maximum slope of a mathematical curve defined by a chemical reaction and holding the reading indefinitely.

Modern laboratories engaged in analytical chemistry such as the determination and utilization of the rate of change of one physical quantity with respect to another generally utilize automatic equipment to observe the reactions and record or display the results thereof. These instruments frequently include inexpensive general purpose minicomputers and auxiliary electronic circuits, including integration systems, variable time systems and hybrid analog digital systems. These laboratories handle large numbers of experiments or evaluations and must be equipped to handle them in a minimum of time with maximum efficiency. Typical measurements, which require obtaining a final or steady state reading, require monitoring of the reaction until completion, which is time consuming and frequently inaccurate. Elaborate electronic systems have been developed to measure the reaction during the early stages with a computer projecting the steady state point. While such electronic systems have provided satisfactory performance, they require special setups and technically qualified technicians to obtain reliable data. These systems include fixed time integration techniques, analog variable time integration systems with modifications, digital integration systems, hybrid analog-digital systems, differentiator systems, etc. All of these systems are expensive to implement and are subject to inaccuracies because of electrical noise introduced into the measurement or electrical noise generated by the instrument itself.

Prior art differentiator systems that provide an output proportional to the rate of change of an input signal can be readily assembled. However, relatively small noise components on the input signal results in a high noise level at the output, which often obscures the desired rate information. Even when the time constant of the differentiator is increased, the noise is usually prohibitive for chemical reaction-rate procedures.

The present invention overcomes the shortcomings of the prior art and discloses a system and unique circuit arrangement which provides an accurate output reading of the point of maximum slop of a reaction that follows a sigmoidally shaped curve. The maximum slop reading is adaptable for automatic recording when measured in accordance with the method and system disclosed and provides rapid times per sample rates while utilizing an equilibrium method of maximum slope detection.

Another object of the present invention is to provide a maximum slop detector that is automatic, suitable for operation with a recorder, and incorporates a display device capable of retaining the final reading indefinitely.

A further object of the present invention is to provide a method for obtaining the maximum slop of an electrical signal.

SUMMARY OF THE INVENTION

A maxium slope detector for determining the maximum slop of an electrical signal provided by a signal source and suitable for use in chemical analysis experiments, according to the principles of the present invention comprises; amplifier means having a relatively low frequency response and input and output terminals, the amplifier means including capacitor feedback and being adapted to amplify the electrical signal, the amplifier means input terminal being adapted to be coupled to the electrical signal source, differentiator means having input and output terminals for differentiating the amplified signal, the differentiator means input terminal being coupled to the amplifier means output terminal; low pass filter means having input and output terminals and a relatively low cut-off frequency for filtering noise appearing on or introduced into the input signal, the filter input terminal being coupled to the differentiator means output terminal, peak detector means having input and output terminals for detecting the differentiated and filtered signal, the detector means input terminal being coupled to the low pass filter means output terminal, coomparator means having two input terminals and an output terminal, one of the input terminals being coupled to the input terminal of the peak detector means, the other of the input terminals being coupled to the output terminal of the peak detector means; display means having input and holding terminals, the input terminal being coupled to the input and output terminals of the peak detector means; and switch means having input and output terminals, the switch means input terminal being coupled to the comparator means output terminal and the switch means output terminal being coupled to the display means holding terminal and adapted to cause the display means to hold its last reading when the slope of the electrical signal starts to decrease.

The method of obtaining and indefinitely holding the point of maximum slope of an electrical signal provided by a signal source according to the principles of the present invention comprises; amplifing the signal with an amplifier having a relatively low frequency response, differentiating the amplified signal, filtering the differentiated signal with a low pass filter, detecting the filtered signal with a peak detector comparing the signal after filtering the differentiated signal with a low pass filter with the signal provided by peak detecting the filtered differentiated signal, providing a second signal when the peak detected signal is less than the filtered differentiated signal, coupling the second signal to a means for holding the filtered signal or the peak detected signal, displaying the filtered signal or the peak detected signal, and holding the displayed signal when the second signal is coupled to the holding means.

The subject matter which we regard as our invention is particularly pointed out and distinctly claimed in the concluding portion of this specification. Our invention, itself, however both as to its organization and method of operation, together with the further objects and advantages thereof may best be understood by reference to the following description taken in connection with the accompanying drawing.

BRIEF DESCRIPTION OF THE DRAWING

FIG. 3 shows the typical voltage wave forms appearing at various points in the circuit arrangement of FIG. 2.

DESCRIPTION OF THE PREFERRED EMBODIMENT

Figure 1:
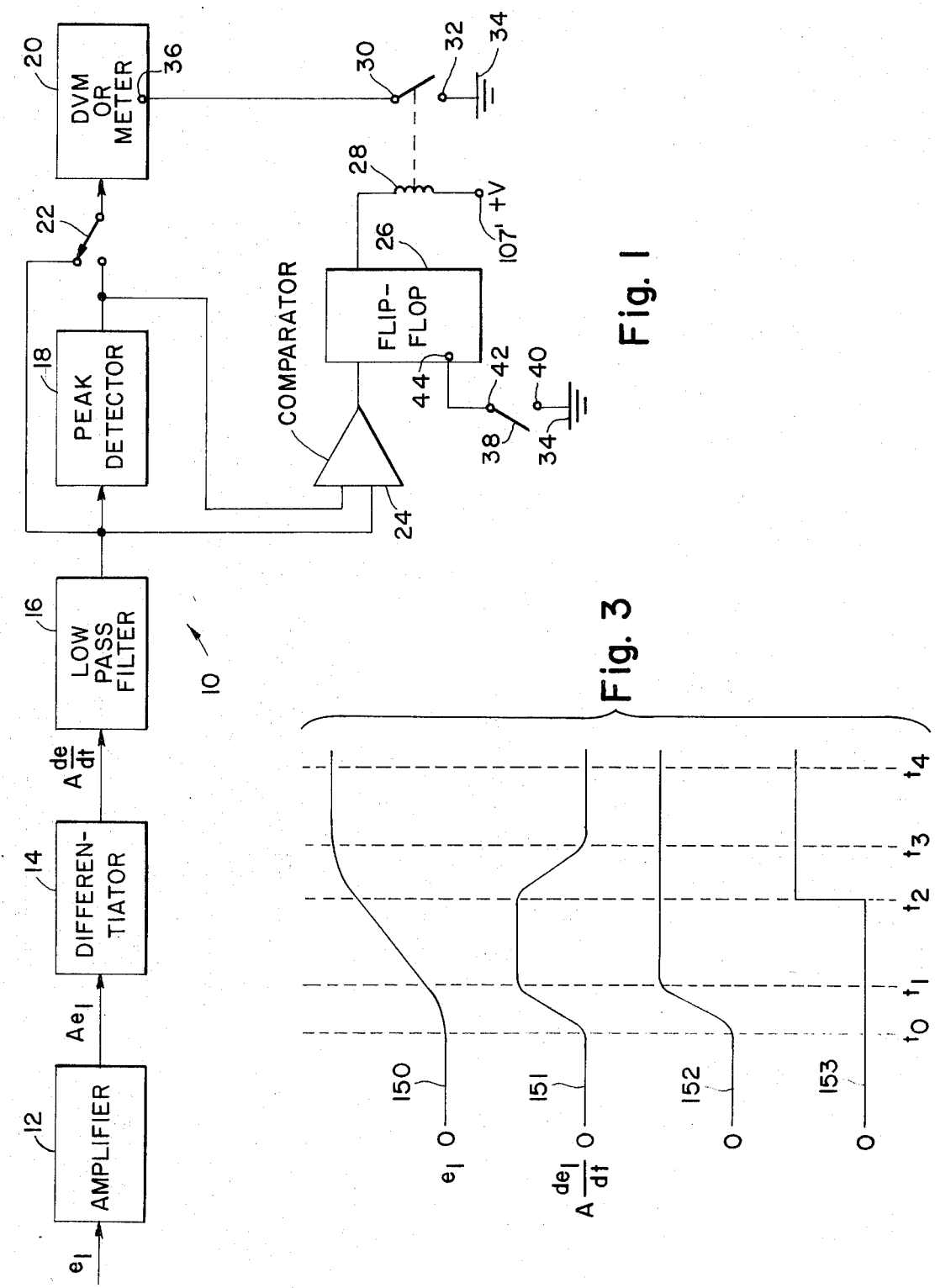
FIG. 1 is a functional block diagram of a maximum slope detector in accordance with the principles of the present invention.

Referring now to the drawing, and in particular to FIG. 1, which shows a functional block diagram of a maximum slop detector 10 fabricated according to the principles of the present invention. The maximum slope detector 10 may be housed in a structure, not shown, which permits mounting of all of the components therein and provides for the portability thereof.

The term operational amplifier or Op-Amp as used herein refers to a conventional integrated circuit semiconductor structure or chip incorporating the equivalent of a network of inter-connected active and passive circuit elements such as transistors, diodes, resistors, capacitors and the like.

In a preferred embodiment of the present invention a transducer, not shown is used to sense a chemical reaction, or the like, and provides an elecreical signal $e_1$ (represented at 150 in FIG. 3), which may follow a typical sigmoidally shaped curve. The electrical signal $e_1$ is coupled into an operational amplifier 12 which has a fixed gain of A. Amplifier 12 amplifies the electrical signal and provides at its output, an electrical signal A $e_1$, which is coupled to a differentiator circuit 14. The differentiator circuit 14 yields an electrical output of A$de_1$/dt (represented at 151 in FIG. 3), which is coupled, via a low pass filter 16, to a peak detector circuit 18. In a preferred embodiment, a digital voltmeter (DVM) 20 is coupled, via a first position of switch 22, to the output of the peak detector circuit 18 to read the peak value of the voltage (represented at 152 of FIG. 3) coupled threreto. Alternatively, the voltage at the output of the low pass filter 16 may be coupled to the DVM 20, via switch 22 in its second position, as shown in FIG. 1, so that either the peak derivative or derivative voltage may be read on the DVM as selected by an operator.

The derivative of voltage $e_1$, obtained at the output of low pass filter 16 and the peak value thereof, obtained at the output of the peak detector circuit 18 are coupled to the input of a comparator amplifier 24. The comparator amplifier 24 provides a voltage at its output whenever the derivative voltage falls below the value of the peak derivative voltage. The output voltage from the comparator 24 is coupled to the input of a conventional flip-flop circuit 26, which changes the state of the voltage at its output terminal when a voltage is coupled to its input terminal. By changing states the flip-flop circuit 26 provides at its output terminal a return path to ground reference 34 for the B+ voltage 107' (+5) with a voltage having a shape as shown at 153 in FIG. 3 thereby, energizing a relay 28. The relay 28 is provided with a pair of normally open contacts 30 and 32. Contact 32 is connected to the common reference ground 34 while contact 30 is coupled to the DVM 20. When the path is completed from terminal 36 to the ground reference 34 via relay contacts 30 and 32 the DVM 20 holds the last value read and displayed thereby, indefinitely.

Switch 38 is normally open and has one contact terminal 40 connected to the common ground reference 34 and a second contact terminal 42 connected to the reset terminal 44 of the flip-flop 26. Closing switch 38 completes the path from the reset terminal 44 to the common ground 34 resetting the flip-flop 26 thereby, releasing relay 26 and opening contacts 30 and 32 so that the DVM may continue reading the voltages applied at its input.

Figure 2:
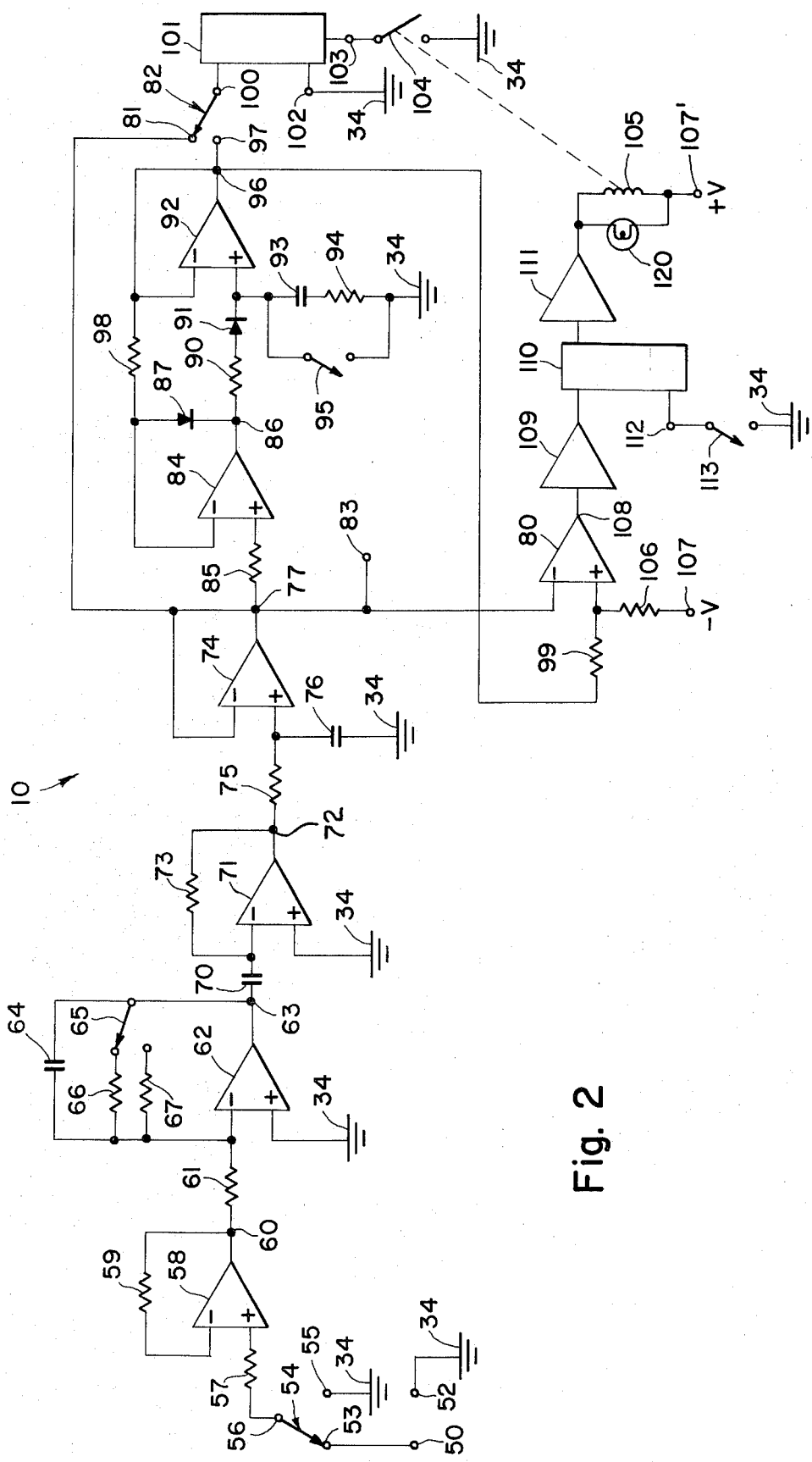
FIG. 2 is a schematic circuit diagram of one embodiment of the present invention.

Referring now to FIG. 2, wherein there is shown a detailed schematic circuit diagram of the preferred embodiment of the maximum slope detector 10. A typical sigmoidally shaped signal $e_1$, shown as 150 in FIG. 3, is coupled across terminals 50 and 52, terminal 52 being connected to the ground reference terminal 34. Terminal 50 is connected to terminal 53 of a single-pole double-throw switch 54. The other terminal 55 of switch 54 is connected to ground reference 34. The movable contact arm terminal 56 of switch 54 is coupled, via resistor 57, to the positive or noninverting terminal of operational amplifier 58. Switch 54 permits the operator to ground the input non-inverting terminal of the input operational amplifier 58 which functions as a preamplifier. Resistor 57 functions to prevent excessive currents from flowing into the amplifier 58 should the instrument's input terminal 50 is connected to an excessive voltage. A resistor 59 is connected from the output terminal 60 of amplifier 58 to the negative or inverting input terminal of amplifier 58 and functions to provide the necessary feedback current in a conventional manner. Operational amplifier (Op-Amp) 58 preferably has a gain of unity (1.0), relatively high input impedance and a relatively low output impedance.

The output terminal 60 of Op-Amp 58 is coupled, via resistor 61, to the inverting input terminal of operational amplifier (Op-Amp) 62. The non-inverting input terminal Op-Amp 62 is connected to the common reference ground 34. The output terminal 63 of Op-Amp 62 is coupled, via a capacitor 64 in parallel with single-pole double-throw switch 65, through which an operator selectively chooses resistor 66 or 67, to the inverting input terminal of Op-Amp 62. Thus, the gain of Op-Amp 62 is either the ratio of resistor 66 divided by resistor 61 or the ratio of resistor 67 divided by resistor 61. The parallel combination of capacitor 64 and resistor 61 function as a low pass filter preferably having a cut-off frequency of 160 Hz, to remove the high frequency noise from the input signal.

Output terminal 63 is coupled, via capacitor 70, to the inverting input terminal of Op-Amp 71. The non-inverting input terminal of Op-Amp 71 is connected to the common reference ground 34. The output terminal 72 of Op-Amp 71 is connected, via a resistor 73, to the inverting input terminal of Op-Amp 71. Preferably Op-Amp 71 employs field-effect input transistors (FET's), thereby providing a very high input impedance. Op-Amp 71, capacitor 70, and resistor 73 function as a differentiator and provide at output terminal 72, an electrical signal 151 which is a derivative of the input signal times a gain constant A. For a sigmoidally shaped signal $e_1$ shown as 150 in FIG. 3, the differentiator will provide an electrical signal A$de_1$/dt, generally shown as 151 in FIG. 3.

The output terminal 72 is coupled to the non-inverting input terminal of Op-Amp 74, via a resistor 75. The non-inverting input terminal of Op-Amp 74 is also coupled to ground reference 34, via a capacitor 76. The output terminal 77 of Op-Amp 74 is connected to the inverting input terminal of Op-Amp 74, as well as, to the inverting input terminal of an Op-Amp 80 and terminal 81 of switch 82 and may also be coupled to a recorder, via a terminal 83. Resistor 75 and capacitor 76 function as a low pass filter preferably having a cut-off frequency of 1.0 Hz, thereby eliminating spurious electrical signals such as the 60 Hz line signals and any low frequency electrical noise inherent to the Op-Amp 71, which preferably has unity gain. Op-Amp 74 functions as a conventional voltage follower providing a low impedance at terminal 83, for the recorder and the inputs to Op-Amp 80 and Op-Amp 84. The output terminal 77 is coupled, via resistor 85 to the non-inverting input terminal of Op-Amp 84. The output terminal 86 of Op-Amp 84 is coupled, via the cathode-anode junction of a diode 87, to the inverting input terminal of Op-Amp 84. The output terminal 86 of Op-Amp 84 is coupled, via a resistor 90 and the anode-cathode junction of a diode 91, to the non-inverting input terminal of Op-Amp 92. The non-inverting input terminal of Op-Amp 92 is also coupled to ground reference 34, via a serially connected capacitor 93 and a resistor 94. A single-pole shorting switch 95 is connected across capacitor 93 and resistor 94 and functions to discharge capacitor 93 to reset the system. The output terminal 96 of Op-Amp 92 is connected to the other terminal 97 of switch 82, via a resistor 98 to inverting input terminal of Op-Amp 84, via resistor 99 to the noninverting input terminal of Op-Amp 80, and to the inverting input terminal of Op-Amp 92.

The movable contact terminal of switch 82 preferably is connected to the input terminal 100 of a digital volt meter which may be of the type known as a Weston Model No. 1291. The digital voltmeter (DVM) 101 is also provided with a second input terminal 102, which is connected to ground reference terminal 34. In addition, the DVM 101 is provided with a holding terminal 103 which is connected, via contacts 104 of relay 105 to the reference ground terminal 34.

The non-inverting input terminal of Op-Amp 80 is coupled, via a resistor 106 and a terminal 107 to a conventional source of negative voltage (−V), not shown. The output terminal 108 of Op-Amp 80 is connected to the input terminal of inverter Op-Amp 109. The output terminal of inverter Op-Amp 109 is connected to the input terminal of flip-flop 110. The output terminal of flip-flop 110 is connected to the input of driver Op-Amp 111. The output terminal of driver Op-Amp 111 is connected to one side of a pilot light 120 and a relay 105. The other side of relay 105 and pilot light 120 is connected to terminal 107' (+V). Terminal 107' is preferably connected to a conventional +5 volt power supply, not shown. Flip-flop 110 is also provided with a terminal 112 which is coupled, via a normally opened switch, to ground reference 34.

In the preferred embodiment of the invention Op-Amp 58, 62, 74, and 84, are of the type known as a uA741, Op-Amp 80 is of the type known as a uA710, and Op-Amps 71 and 92 are of the type known as a uA8007C. Inverter Op-Amp 109 and driver Op-Amp 111 may be of any conventional type capable of providing the neceassary driving voltage and current.

In operation, the system functions as follows. The movable arm of switch 54 is switched to terminal 55, which is connected to ground reference 34, to calibrate the system. Switch 113 is closed to connect terminal 112 to ground 34, thereby resetting flip-flop 110, which opens (de-energizes) relay 105 removing the hold from the DVM 101. Switch 95 is also momentarily closed to discharge capacitor 93. The movable arm of switch 54 is then moved from calibrate terminal 55 to operate terminal 53. A sigmoidally shaped signal $e_1$ (150 in FIG. 3) is provided to terminal 50 where it is coupled, via a resistor 57, to the non-inverting input terminal of Op-Amp 58 where the signal is amplified with unity gain (impedance transformation) and in turn coupled, via resistor 61, to the variable gain Op-Amp 62, the sigmoidally shaped electrical signal is obtained from a conventional transducer arrangement which may be monitoring a chemical reaction, e.g., light is detected by a photocell after passing through a liquid under observation whose light transmitting characteristic is related to the reaction. The output of Op-Amp 62 provides an electrical signal of $Ae_1$; where A is either 1 or 10 depending on the position of switch 65 and is selected by the operator to yield a signal of sufficient amplitude to exceed the operating threshold of the differentiating circuitry. The signal is filtered by the low pass filter comprising the combination of resistor 61 and capacitor 64 thereby removing an electrical noise therefrom.

The signal appearing on the ouput terminal 63 of Op-Amp 62 is coupled through the differentiating circuitry including capacitor 70, resistor 73 and Op-Amp 71 yielding an electrical signal at output terminal 72 of A $de_1/dt$, shown as 151 in FIG. 3. The gain A is provided by Op-Amp 62. Op-Amp 71 has unity gain. The electrical signal then passes through the low pass filter, consisting of a resistor 75 and a capacitor 76 which function to remove unwanted spurious signals such as 60 Hz line signals and low frequency noise inherent to the Op-Amp 71. The signal is coupled to Op-Amp 74, which is connected as a conventional voltage follower and provides a low impedance at terminal 83. Terminal 83 may be connected to a recorder input, not shown, and the input to Op-Amp 80 and 84.

The signal is coupled, via resistor 85, to the non-inverting input terminal of Op-Amp 84, which is part of the peak detector circuitry. The peak detector circuitry further includes Op-Amp 92; diodes 87 and 91; resistors 90, 94 and 98; capacitor 93; and switch 95. The other input signal coupled to the inverting terminal of Op-Amp 84 is obtained from its output terminal 96. The output current of Op-Amp 84 flowing through resistor 90 and peak diode 91 charges capacitor 93 to the peak value of the input electrical signal appearing at the non-inverting input terminal of Op-Amp 84 less the voltage drop across diode 87. This voltage drop is compensated for by Op-Amp 84 since both inputs thereto must be approximately equal. Resistor 98 and diode 87 function to prevent the closed loop circuit consisting of Op-Amp 84 and 92 from saturating when the conventional power (+5 Volts D.C., not shown) is first applied to the system. If the voltage appearing across diode 87 is sufficiently high to cause diode 87 to conduct current therethrough, then Op-Amp 84 will operate as a voltage follower with a gain of unity, thereby, preventing saturation. The resistor 90 functions to limit the current through diode 91 and resistor 94 functions to limit the current through switch 95 when switch 95 is closed to discharge capacitor 93.

When the input voltage at the non-inverting terminal of Op-Amp 84 starts to decrease, diode 91 becomes non-conductive (opens) and the voltage appearing across capacitor 93 remains constant. Preferably the input impedance of the FET Op-Amp 92 is about $10^{12}$ ohms and the leakage current of diode 91 is extremely low, thereby permitting capacitor 93 to retain its charge for a relatively long period of time. The electrical output appearing at terminal 96 is coupled via switch 82 to the DVM 101, as noted earlier, thereby displaying the peak value of the voltage appearing across capacitor 93.

cal signal is obtained by using a peak detector to detect the peak of the signal after it has been differentiated and comparing it to its differentiated value and noting when the peak detected value becomes less then the differentiated value.

A slope detector has been fabricated, in accordance with the principles of the present invention, with components having the following values:

| ITEM | DESCRIPTION | | MANUFACTURER |
|---|---|---|---|
| 58,62,74,84 | Op-Amp | MC1741 | Motorola Corp. |
| 80 | do. | MC1710 | do. |
| 71, 92 | do. | 8007C | Intersil Corp. |
| 109, 111 | do. | SN7401 | Texas Instrument |
| 110 | do. | SN7400 | do. |
| 87 | Diode | 1N4148 | I.T.T. |
| 91 | do. | 1N3141 | Computer Diode |
| 101 | Voltmeter | Model No. 1291 | Weston Corp. |
| 90, 94 | Resistor | 100 ohms | Allen Bradley |
| 61, 99 | do. | 1.0k ohms | do. |
| 57,59,66,75,85,98 | do. | 10 k ohms | do. |
| 67, 106 | do. | 100 k ohms | do. |
| 73 | do. | 1.0 Meg ohms. | do. |
| 64 | Capacitor | .01 $\mu f$ | Sprague Corp. |
| 70, 93 | do. | 1.0 $\mu f$ | do. |
| 76 | do. | 100 $\mu f$ | do. |

The comparator Op-Amp 80 has the differentiated signal appearing at terminal 77 coupled to its inverting input terminal and the peak amplitude signal appearing at terminal 96 coupled to its non-inverting input terminal. When no signal appears at both input terminals of Op-Amp 80, the output is zero volts aince the inverting input terminal has coupled to it a negative voltage (5 volts).

FIG. 3 shows the voltage 152 appearing at the output of the peak detector at terminal 96 with respect to time for an input voltage $e_1$ having the general shape shown at 150. The output voltage of the comparator Op-Amp 80 will be as follows with respect to time:

| Time | Non-Inverting Input | Inverting Input | Op-Amp 80 Output |
|---|---|---|---|
| $t_0$ | $-\Delta V_1$ | 0 | 0 |
| $t_2-t_1$ | $e_d-\xi V_1$ | $e_d$ | 0 |
| $t_3-t_2$ | $e_d-\Delta V_1$ | $e_d \rightarrow 0$ | +5 |
| $t_4-t_3$ | $e_d-\Delta V_1$ | 0 | +5 | where $e_d$ is the voltage having the general shape shown at 152 in FIG. 3 and $V_i$ is the negative bias voltage (5 volts) connected to terminal 107.

Thus, as shown in the table above, the comparator Op-Amp 80 will provide a positive output voltage starting at $t_2$ when the shape of $e_1$ (150) starts to decrease. The output voltage appearing at terminal 108 of Op-Amp 80 is inverted by inverter Op-Amp 109. The output signal of inverter Op-Amp 109 is coupled to the conventional flip-flop 110 and causes it to change its state. The voltage provided at the output of flip-flop 110 is amplified by power driver 111, which completes the ground circuit from terminal 107' (+V) and energizes indicator light 120 and relay 105. The contacts 104 of relay 105 connect terminal 103 of the DVM 101 to ground reference 34, thereby holding the information indefinitely in the readout of the DVM 101. The relay 105, with additional contacts, may also be used to activate other auxiliary devices such as a line printer, etc. Thus, the value of the maximum slope of an electri- Hereinbefore, has been disclosed a peak slope detector which utilizes an analog differentiator, is relatively simple and provides accurate results. The preferred embodiment utilizes recent advances in integrated operational amplifiers (Op-Amp) and performs more successfully than prior art systems because rapid voltage changes due to noise are virtually eliminated from the output by a low pass filter at the input to the differentiator and a low pass filter at the output thereof. Unity gain in the differentiator practically eliminates internal noises generated therein, thereby, increasing the system's accuracy. Preferably any required gain is provided before the signal is differentiated and not in the differentiator itself.

Having thus set forth the nature of the invention, what is claimed is:

1. A slope detecting instrument for determining the maximum slope of an electrical signal provided by a signal source comprising:
   a. amplifier means having a relatively low frequency response and input and output terminals, said amplifier means including capacitor feedback and adapted to amplify the electrical signal, said amplifier means input terminal being adapted to be coupled to said electrical signal source;
   b. differentiator means having input and output terminals for differentiating the amplified signal, said differentiator means input terminal being coupled to said amplifier means output terminal;
   c. low pass filter means having input and output terminals and a relatively low cut-off frequency for filtering noise appearing on or introduced into said electrical signal, said filter means input terminal being coupled to said differentiator means output terminal;
   d. peak detector means having input and output terminals for detecting said differentiated and filtered signal, said detector means input terminal being coupled to said low pass filter means output terminal;
   e. comparator means having two input terminals and an output terminal, one of said input terminals being coupled to the input terminal of said peak detector means, the other of said input terminals being coupled to the output terminal of said peak detector means;

f. display means having input and holding terminals, said input terminal being coupled to the input and output terminals of said peak detector means; and g. switch means having input and output terminals, said switch means input terminal being coupled to said comparator means output terminal, said switch means output terminal being coupled to said display means holding terminal and adapted to cause said display means to hold its last reading when the slope of said electrical signal starts to decrease.

2. A maximum slope detecting instrument according to claim 1 further including preamplifer means having input and output terminals, said preamplifier means output terminal being coupled to said amplifier means input terminal and said preamplifier means input terminal being adapted to be coupled to said electrical signal source, said preamplifier means having a relatively high input impedance, a relatively low output impedance, and unity gain.

3. A maximum slope detecting instrument according to claim 2 wherein said preamplifier means additionally includes switch means, said switch means being coupled to said preamplifier means input terminal and adapted to calibrate said maximum slope detector by providing a zero reference.

4. A maximum slope detecting instrument according to claim 1 wherein said amplifier means is provided with control means coupled from said amplifier means output terminal to said amplifier means input terminal, said control means being adapted to control the amplification of said amplifier means.

5. A maximum slope detecting instrument according to claim 1 wherein said low pass filter means includes a twoterminal resistor, one resistor terminal being coupled to the differentiator means output terminal, the other resistor terminal being coupled to the peak detector means input terminal and a capacitor, said capacitor being coupled from the peak detector means input terminal to a reference ground terminal.

6. A maximum slope detecting instrument according to claim 5 wherein said low pass filter means further includes an isolation amplifier having input and output terminals, said isolation amplifier input terminal being connected to said other resistor terminal and said isolation amplifier output terminal being coupled to said peak detector means input terminal.

7. A maximum slope detecting instrument according to claim 1 wherein said peak detector means includes a first operational amplifier having first and second input terminals and an output terminal, said first input terminal being coupled to the output terminal of said filter means, said second terminal being coupled to the detector output terminal by a first forwardly poled diode, a second operational amplifier having first and second input terminals and an output terminal, said first operational amplifier output terminal being coupled by a serially connected first resistor and a second forwardly poled diode to the first input terminal of said second operational amplifier, a storage capacitor, said storage capacitor being additionally coupled from the first input terminal of said second operational amplifier to said reference ground terminal, a second resistor, said second resistor being coupled from the second input terminal of said first operation amplifier to said second input terminal and commonly connected output terminal of said second operational amplifier, said second operational amplifier output terminal being additionally coupled to said display means input terminal.

8. A maximum slope detecting instrument according to claim 1 wherein said switch means includes a flip-flop having first and second input terminals and an output terminal, the electrical signal appearing at said comparator means output terminal being adapted to be coupled to said first flip-flop input terminal to change the state of the voltage appearing at said flip-flop output terminal when the slope of said electrical signal starts to decrease, said second flip-flop input terminal being adapted to be selectively connected to a means for resetting said flip-flop to its original state, and said flip-flop terminal being adapted to be coupled to said display means holding terminal.

9. The method of obtaining and indefinitely holding the point of maximum slope of an electrical signal provided by a signal source comprising:

a. amplifying said electrical signal with an amplifier having a relatively low frequency response;

b. differentiating said amplified electrical signal;

c. filtering said differentiated electrical signal with a low pass filter;

d. detecting said filtered electrical signal with a peak detector;

e. comparing the electrical signal obtained in c., with the electrical signal provided in d.;

f. providing a second electrical signal when the electrical signal in d., is less than the electrical signal in c.;

g. coupling said second electrical signal to a means for holding said filtered electrical signal or said peak detected electrical signal;

h. displaying said filtered electrical signal or said peak detected electrical signal; and i. holding said displayed electrical signal when said second electrical signal is coupled to said holding means.

10. The method of obtaining and holding the point of maximum slope of an electrical signal according to claim 9 further including, preamplifying said electrical signal with a broad-band amplifier.

11. A slope detecting instrument for determining the maximum slope of an electrical signal provided by a signal source comprising:

a. means coupled to said signal source for amplifying said electrical signal, said amplifying means having a relatively low frequency response;

b. means coupled to said amplifying means for differentiating said amplified signal;

c. means coupled to said differentiating means for filtering said differentiated signal, said filtering means having a relatively low cut-off frequency for eliminating noise appearing on and introduced into said electrical signal;

d. means coupled to said filtering means for peak detecting said filtered signal;

e. means coupled to said filtering means and said peak detecting means for comparing said peak detected signal and said filtered signal;

f. means coupled to said peak detecting means for displaying said peak detected signal or said filtered signal;

g. means coupled to said comparing means for causing said displaying means to hold its last display when said peak detected signal starts to decrease.

* * * * *

UNITED STATES PATENT OFFICE
CERTIFICATE OF CORRECTION

Patent No. 3,869,656          Dated March 4, 1975

Inventor(s) Julian Saltz et al.

It is certified that error appears in the above-identified patent and that said Letters Patent are hereby corrected as shown below:

In the Specification

Column 1, line 4, "porportional" should read -- proportional -- line 51, "slop" should read--slope--
              line 52, "slop" should read--slope--
              line 58, "slop" should read--slope--
              line 63, "slop: should read--slope--.

Column 2, line 1, "slop" should read--slope--
              line 21, "coomparator" should read --comparator-- line 40, "amplifing" should read --amplifying line 45, after "nal" insert--obtained--

Column 3, line 24, "elecreical" should read --electrical--

Column 4, line 24, "is" should read--be--

UNITED STATES PATENT OFFICE
CERTIFICATE OF CORRECTION

Patent No. 3,869,666           Dated March 4, 1975

Inventor(s) Julian Saltz et al.

It is certified that error appears in the above-identified patent and that said Letters Patent are hereby corrected as shown below:

Column 7, line 43, should read -- A --

Signed and sealed this 17th day of June 1975.

(SEAL)
Attest:

RUTH C. MASON
Attesting Officer

C. MARSHALL DANN
Commissioner of Patents
and Trademarks